US012618777B2

(12) United States Patent
You et al.

(10) Patent No.: US 12,618,777 B2
(45) Date of Patent: *May 5, 2026

(54) RAMAN-ACTIVE NANOPARTICLE FOR SURFACE-ENHANCED RAMAN SCATTERING AND METHOD OF PRODUCING THE SAME

(71) Applicant: KOREA RESEARCH INSTITUTE OF STANDARDS AND SCIENCE, Daejeon (KR)

(72) Inventors: Eun-Ah You, Daejeon (KR); Jae-Eul Shim, Gyeongsangnam-do (KR); Tae Geol Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 1029 days.

This patent is subject to a terminal disclaimer.

(21) Appl. No.: 17/723,855

(22) Filed: Apr. 19, 2022

(65) Prior Publication Data

US 2022/0349826 A1 Nov. 3, 2022

(30) Foreign Application Priority Data

Apr. 21, 2021 (KR) ........................ 10-2021-0051945

(51) Int. Cl.
*G01N 21/65* (2006.01)

(52) U.S. Cl.
CPC ..... *G01N 21/658* (2013.01); *G01N 2021/653* (2013.01)

(58) Field of Classification Search
CPC .... G01N 21/65; G01N 21/658; G01N 33/483; G01N 33/553; B82B 1/00; B82Y 30/00; B82Y 40/00
See application file for complete search history.

(56) References Cited

PUBLICATIONS

Khlebtsov et al. (Gap-enhanced Raman tags: fabrication, optical properties, and theranostic applications, Theranostics 2020, vol. 10, Issue 5 (Year: 2020).*
Zhang et al. (Ultrabright gap-enhanced Raman tags for high-speed bioimaging, Nat Commun 10, 3905 (2019). (Year: 2019).*

* cited by examiner

*Primary Examiner* — Alexandre F Ferre
(74) *Attorney, Agent, or Firm* — Hauptman Ham, LLP

(57) ABSTRACT

Provided is a Raman-active nanoparticle including: a spherical plasmonic metal core; a plasmonic metal shell having surface irregularities; and a self-assembled monolayer which binds to each of the core and the shell, is positioned between the core and the shell, and includes a Raman reporter satisfying the following Chemical Formula 1:

$NO_2$—Ar—SH (Chemical Formula 1)

wherein Ar is a (C6-C12) arylene group.

16 Claims, 9 Drawing Sheets

【FIG. 1】
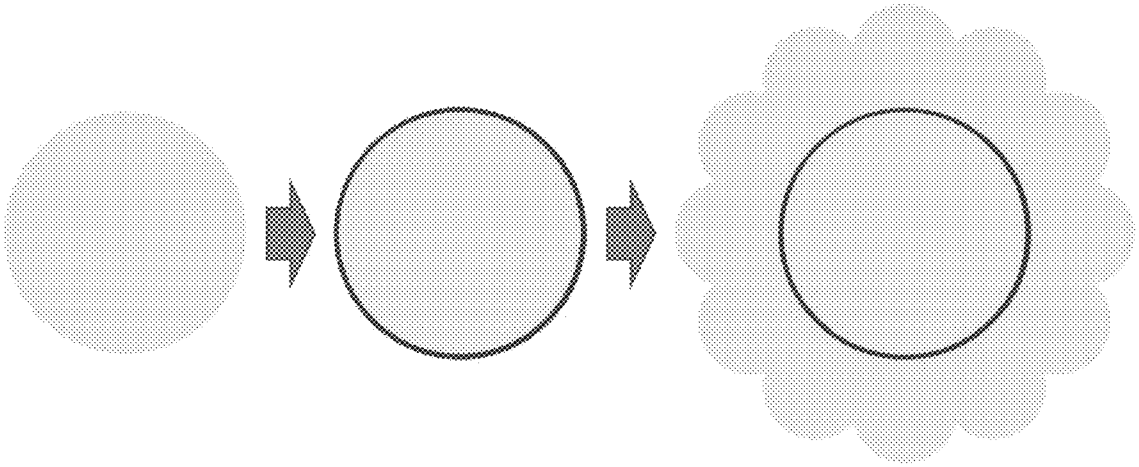

【FIG. 2a】
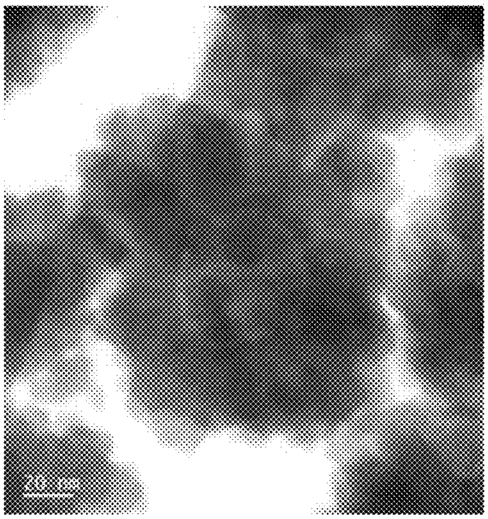
【FIG. 2b】
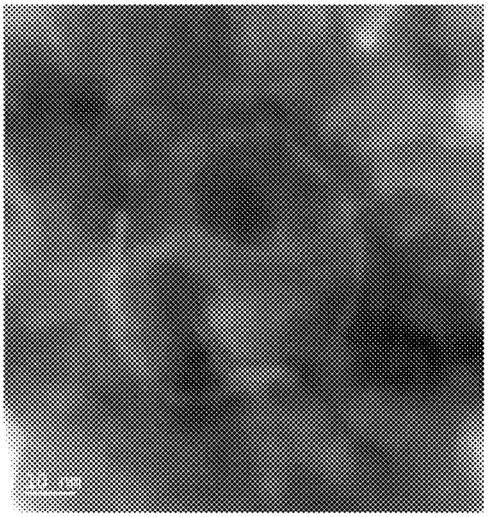

【FIG. 3a】
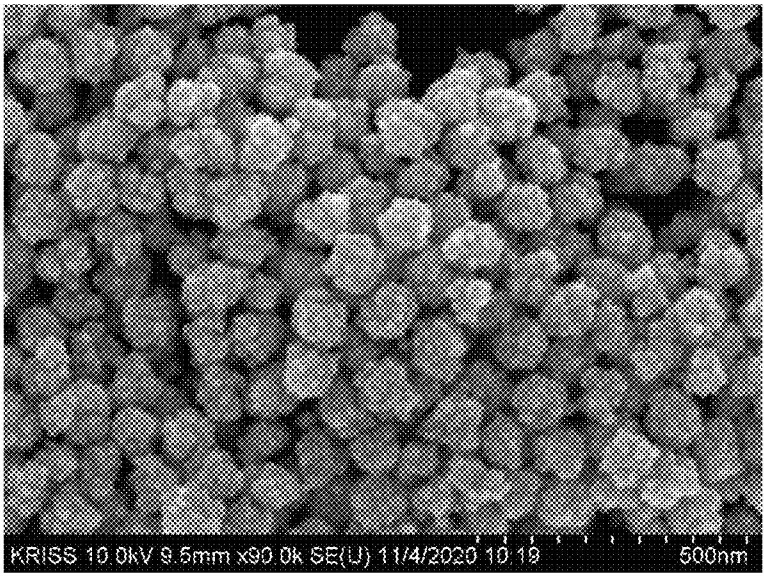
【FIG. 3b】
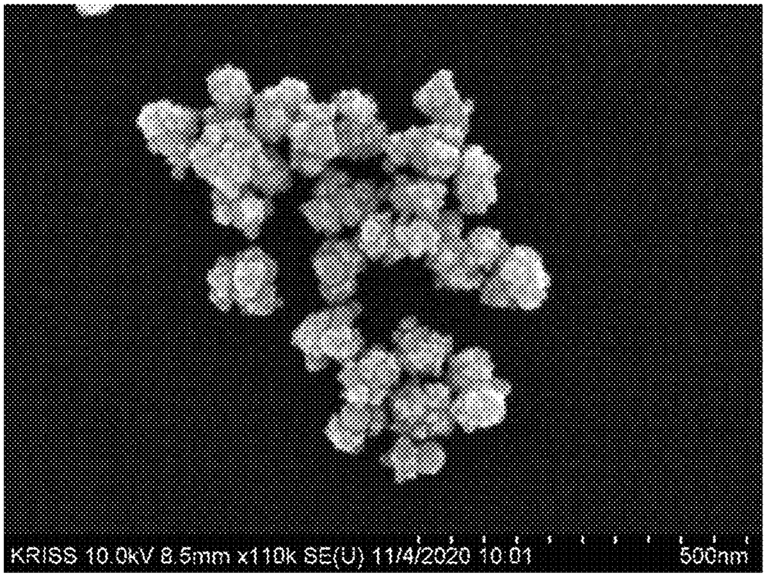

【FIG. 3c】
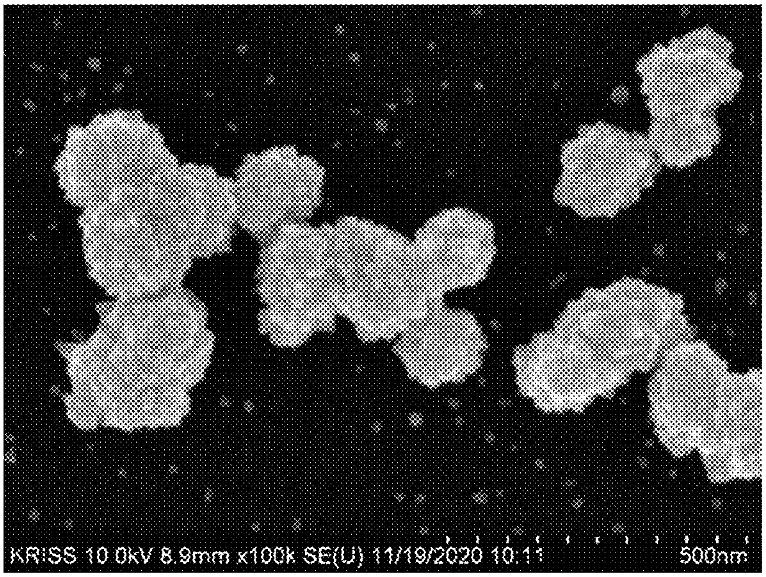
【FIG. 3d】
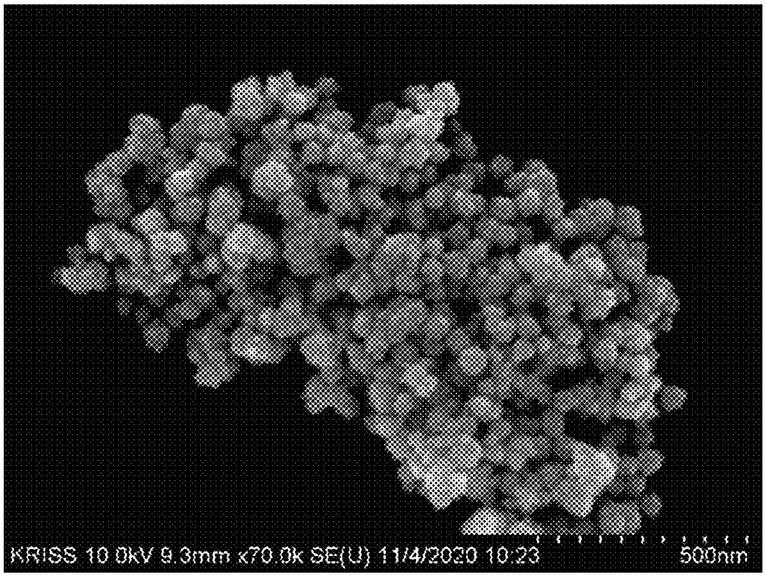

【FIG. 3e】
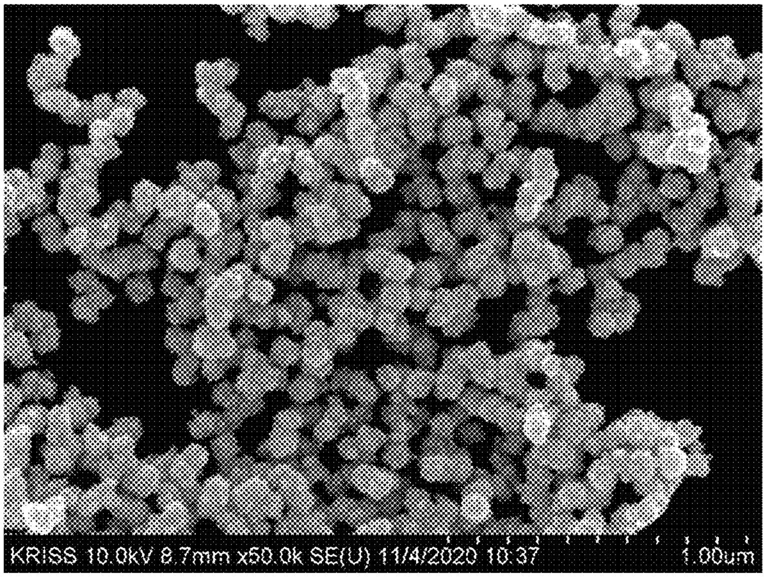

【FIG. 4a】
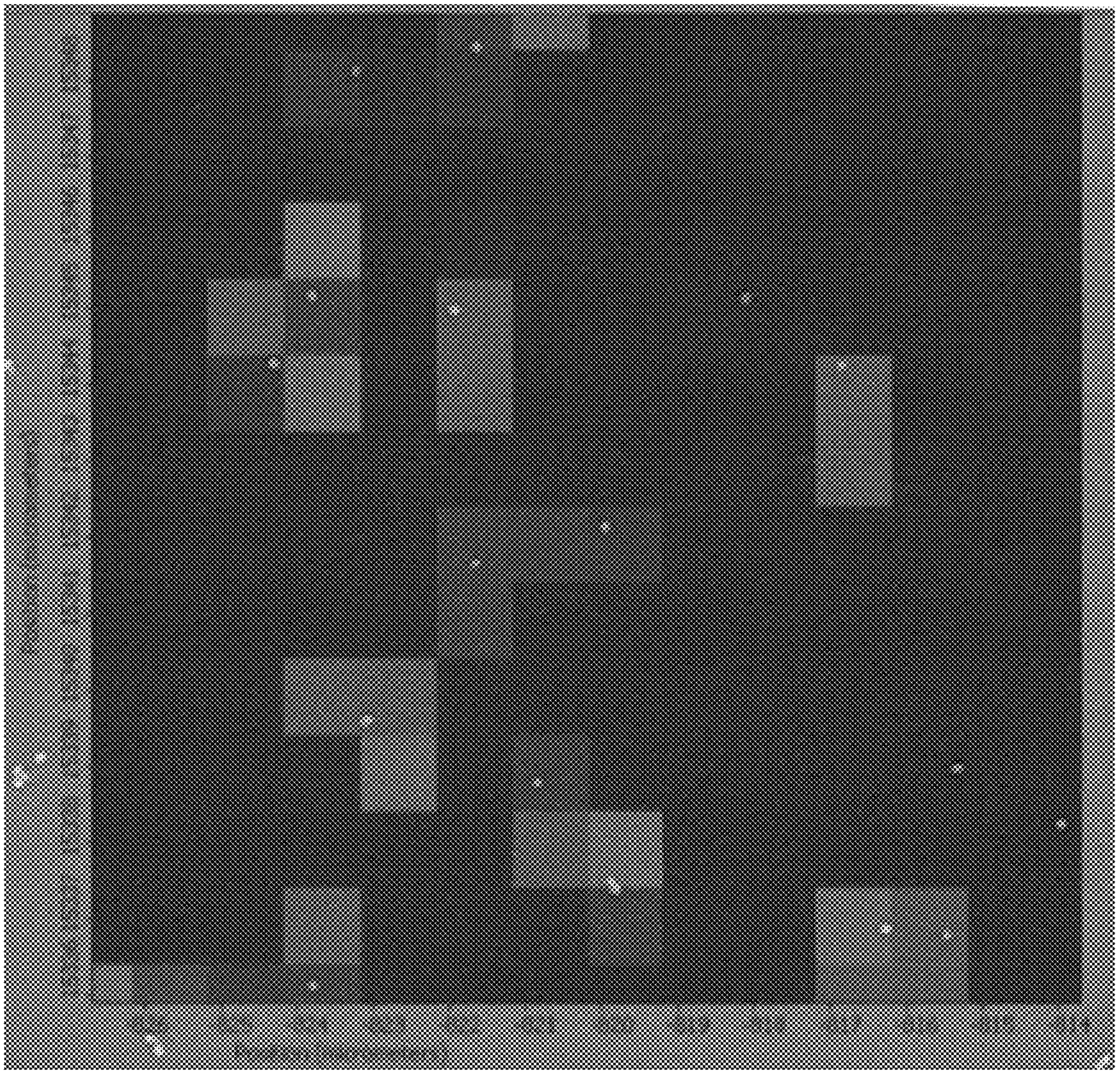

【FIG. 4b】
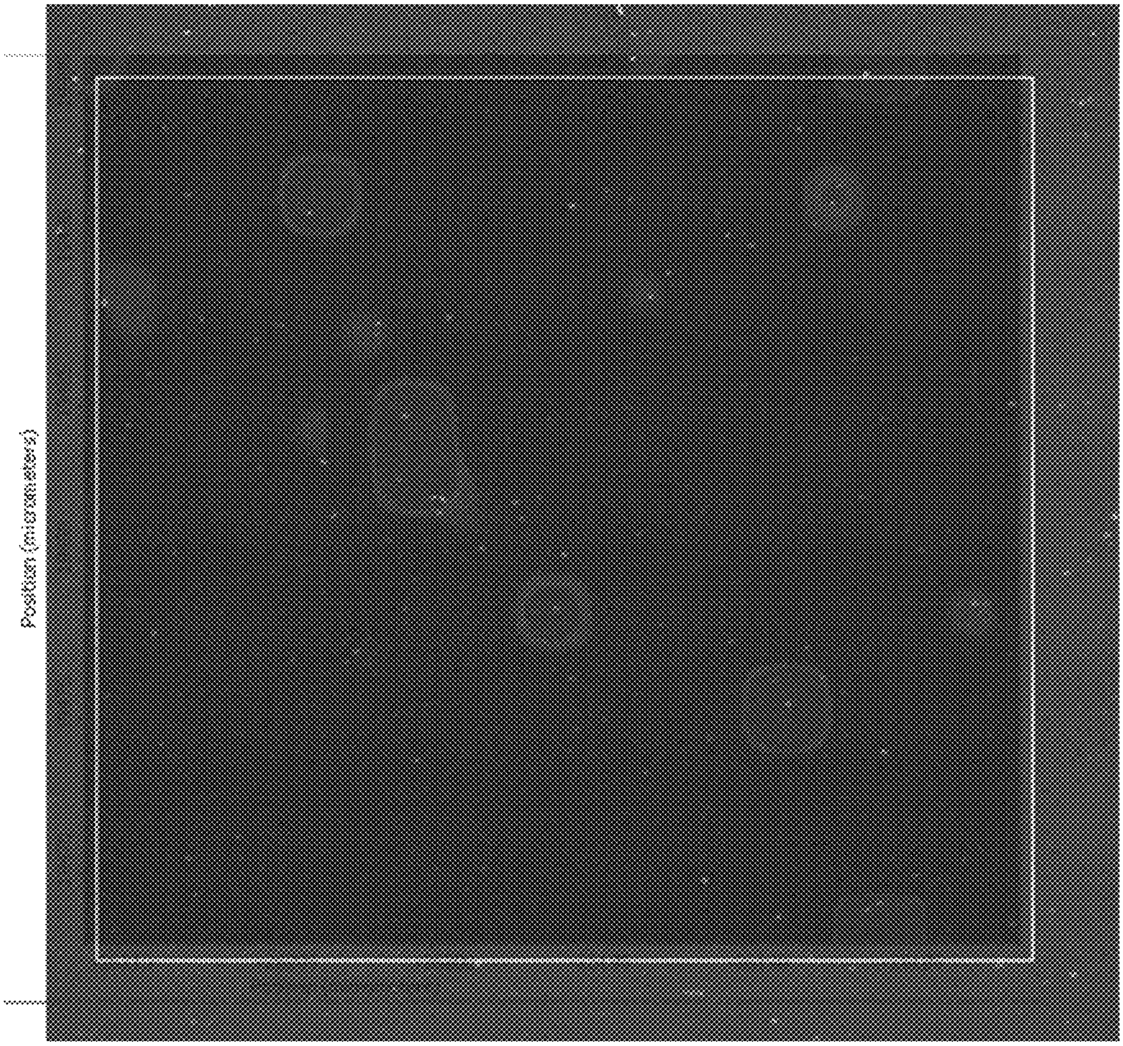

【FIG. 5a】
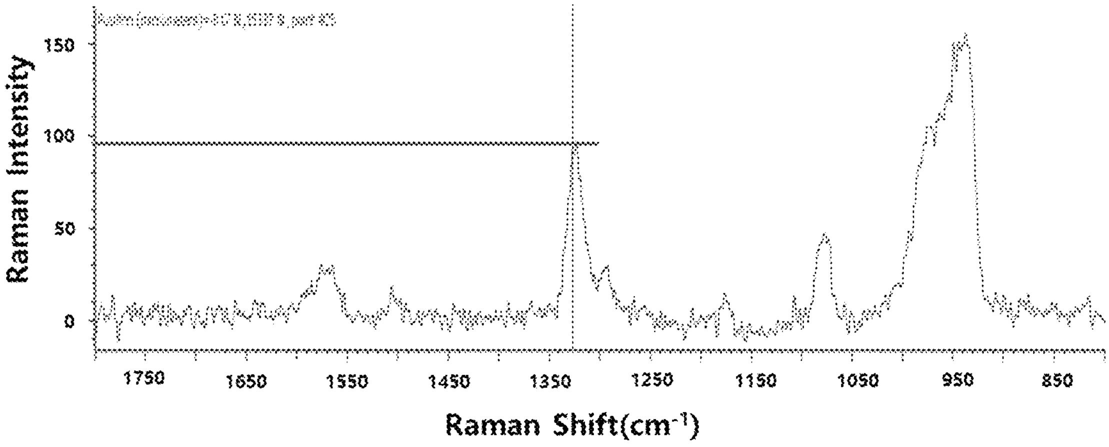

【FIG. 5b】
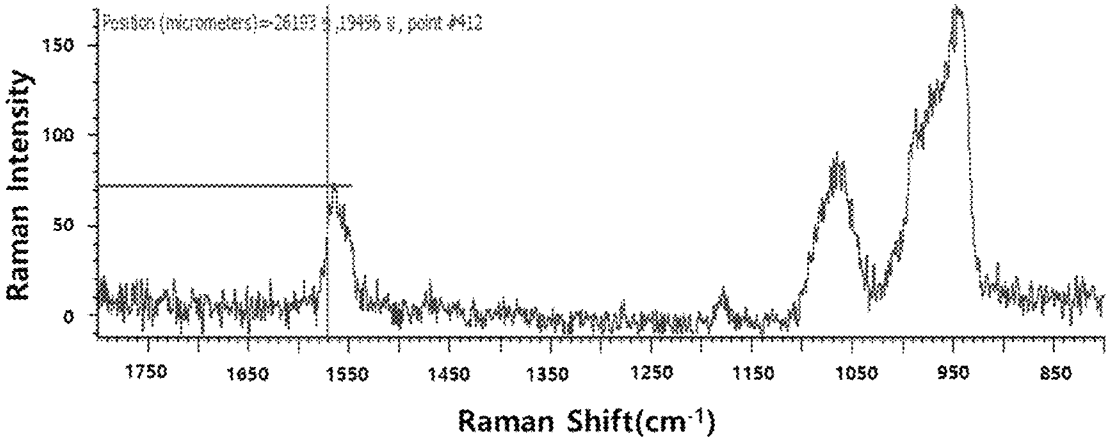

RAMAN-ACTIVE NANOPARTICLE FOR SURFACE-ENHANCED RAMAN SCATTERING AND METHOD OF PRODUCING THE SAME

TECHNICAL FIELD

The following disclosure relates to a Raman-active nanoparticle for surface-enhanced Raman scattering and a method of producing the same, and more particularly, to a Raman-active nanoparticle which allows detection at a monomolecular level and may be mass-produced by a simple process, and a method of producing the same.

BACKGROUND

Surface-enhanced Raman spectroscopy originated from surface plasmon resonance (SPR) which is collective oscillations of free electrons on the surface of a metal nanostructure uses a phenomenon that Raman scattering intensity rapidly increases by $10^6$ to $10^8$ times or more when molecules are adsorbed on the surface of the metal nanostructure of gold, silver, and the like. The surface-enhanced Raman spectroscopy directly provides information about the oscillation state of molecules or a molecular structure, and is recognized as a powerful analysis method for ultra-sensitive chemical, biological, and biochemical analysis.

The surface-enhanced Raman spectroscopy fused with nanotechnology, which is currently developing at a very rapid pace, is particularly greatly expected to be critically used as a biomedical sensor. As an example, currently, a study for carrying out the initial diagnosis of various diseases including Alzheimer's disease or diabetes together with high-sensitivity DNA analysis, using surface-enhanced Raman spectroscopy is actively in progress.

However, though surface-enhanced Raman spectroscopy has high selectivity, high informativity, and high sensitivity, signal enhancement changes very sensitively depending on the size or type of a gap or a junction between plasmon metals, a distance between a hot spot and a Raman signal generation source, and the like, and thus, reliability and reproducibility of measurement are deteriorated.

Thus, the present inventors improved the reproducibility of measurement by developing a Raman-active particle having a core-shell structure using a previously known Raman reporter, as disclosed in Korean Patent Laid-Open Publication No. 10-2021-0028984.

However, since there are disadvantages of not only limitations in terms of the intensity of Raman signal enhancement and the reproducibility of measurement but also non-reproducibility of the shape of Raman-active particles produced under the same conditions, there is a need to develop a Raman-active particle which has a high degree of sensitivity to allow detection at a single molecule level, allows detection with improved reliability and reproducibility, and has excellent reproducibility when produced under the same conditions, in order to be used in the field of bioscience such as early diagnosis of diseases.

RELATED ART DOCUMENTS

Patent Documents

Korean Patent Laid-Open Publication No. 10-2021-0028984

SUMMARY

Technical Problem

An embodiment of the present invention is directed to providing a Raman-active nanoparticle which has strictly defined hot spots, represents uniform Raman activity based on one nanoparticle, and simultaneously represents uniform Raman activity between particles, thereby allowing reproducible and reliable detection.

Another embodiment of the present invention is directed to providing a Raman-active nanoparticle having extremely good sensitivity to allow detection at a monomolecular level.

Another embodiment of the present invention is directed to providing a Raman-active nanoparticle having biocompatibility to be suitable as biosensing such as disease detection.

Another embodiment of the present invention is directed to providing a method of producing a Raman-active nanoparticle which has excellent reproducibility of the shape when produced under the same conditions to allow reproducible and reliable detection and has extremely good sensitivity.

Still another embodiment of the present invention is directed to providing a method of producing a Raman-active nanoparticle having very good commerciality so that the particles may be mass-produced at room temperature within a short time by a simple method.

Technical Solution

In one general aspect, a Raman-active nanoparticle includes: a spherical plasmonic metal core; a plasmonic metal shell having surface irregularities; and a self-assembled monolayer which binds to each of the core and the shell, is positioned between the core and the shell, and includes a Raman reporter satisfying the following Chemical Formula 1:

$NO_2$—Ar—SH (Chemical Formula 1)

wherein Ar is a (C6-C12) arylene group.

In the Raman-active nanoparticle according to an exemplary embodiment of the present invention, the Raman reporter may satisfy the following Chemical Formula 2:

(Chemical Formula 2)

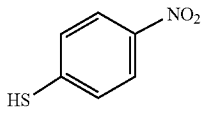

In the Raman-active nanoparticle according to an exemplary embodiment of the present invention, the plasmonic metal shell may include plasmonic metal fine particles having an average size of 0.3D to 1D, based on a diameter (D) of the metal core, and may have surface irregularities due to the plasmonic metal fine particles.

In the Raman-active nanoparticle according to an exemplary embodiment of the present invention, in the plasmonic metal shell, an inner shape of the shell in contact with the self-assembled monolayer may be spherical.

In the Raman-active nanoparticle according to an exemplary embodiment of the present invention, the plasmonic metal core may have an average diameter of 20 to 100 nm.

In the Raman-active nanoparticle according to an exemplary embodiment of the present invention, the self-assembled monolayer may have a thickness of 0.5 to 2.0 nm.

In the Raman-active nanoparticle according to an exemplary embodiment of the present invention, the plasmonic metal core and the plasmonic metal shell may be independently of each other one or more metals selected from gold, silver, platinum, palladium, nickel, aluminum, and copper.

In the Raman-active nanoparticle according to an exemplary embodiment of the present invention, the plasmonic metal core and the plasmonic metal shell may be the same metal.

The Raman-active nanoparticle according to an exemplary embodiment of the present invention may further include a receptor which is fixed to the plasmonic metal shell and binds to an analyte.

In the Raman-active nanoparticle according to an exemplary embodiment of the present invention, a surface-enhanced Raman scattering signal in Raman mapping may be detected in 60% or more of the Raman-active nanoparticles among all Raman-active nanoparticles.

In another general aspect, a method of producing Raman-active nanoparticles includes: a) forming a self-assembled monolayer including a Raman reporter satisfying the following Chemical Formula 1 on a spherical plasmonic metal core; and b) using a reaction solution in which a buffer solution, the metal core on which the self-assembled monolayer is formed, and a plasmonic metal precursor are mixed, to form a plasmonic metal shell which surrounds the metal core on which the self-assembled monolayer is formed and has surface irregularities:

$NO_2$—Ar—SH (Chemical Formula 1)

wherein Ar is a (C6-C12) arylene group.

In the method of producing Raman-active particles according to an exemplary embodiment of the present invention, the Raman reporter may satisfy the following Chemical Formula 2:

(Chemical Formula 2)

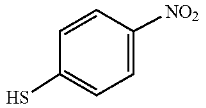

In the method of producing Raman-active particles according to an exemplary embodiment of the present invention, a mole ratio obtained by dividing the number of moles of the buffer in the buffer solution by the number of moles of the plasmonic metal precursor in the buffer solution may be 10 to 100.

In the method of producing Raman-active particles according to an exemplary embodiment of the present invention, a molar concentration of the buffer in the buffer solution may be 10 to 200 mM.

In the method of producing Raman-active particles according to an exemplary embodiment of the present invention, the plasmonic metal core may have a diameter of 20 to 100 nm.

The method of producing Raman-active particles according to an exemplary embodiment of the present invention may further include: after step b), c) fixing a receptor which binds to an analyte to the plasmonic metal shell.

Advantageous Effects of Invention

Since the Raman-active nanoparticle according to an exemplary embodiment of the present invention has a core-shell structure of a spherical plasmon active core and a plasmon active shell having surface irregularities by fine particles and has a self-assembled monolayer including a Raman reporter having a Chemical Formula of $NO_2$—Ar—SH (Ar is a (C6-C12) arylene group) positioned between the core and the shell, the Raman-active nanoparticle may have hot spots which are uniformly present in the entire area of the nanoparticle and may greatly improve sensitivity without impairing isotropic Raman activity in the nanoparticle and the uniformity of Raman activity between the nanoparticles by bumpy irregularities which are uniformly formed over the entire surface area of the metal shell.

In addition, the Raman-active nanoparticle according to an exemplary embodiment of the present invention has uniform Raman activity based on the nanoparticles, allows reproducible detection since a Raman signal is detected in 60% or more of the Raman-active nanoparticles among all Raman-active nanoparticles, and has excellent detection ability at a monomolecular level.

In addition, since the Raman-active nanoparticle according to an exemplary embodiment of the present invention has well-defined hot spots continuously in the entire area of the nanoparticle and a Raman reporter is uniformly positioned at a high density in the well-defined hot spots, a biochemical material (biomaterial) having a several to dozens of micrometer size may be also reproducibly detected.

In addition, the method of producing Raman-active nanoparticles according to an exemplary embodiment of the present invention is an extremely simple method in which a buffer solution, a metal precursor, and a spherical core metal are mixed at room temperature without the aid of a surfactant, and may mass-produce the Raman-active nanoparticles having the advantages described above within a short time and has excellent reproducibility of the shape of the Raman-active nanoparticles.

BRIEF DESCRIPTION OF THE DRAWINGS

FIG. 1 is a schematic diagram which schematically shows a process of producing the Raman-active nanoparticles of the present invention.

FIG. 2*a* and FIG. 2*b* are transmission electron microscope (TEM) images of the Raman-active nanoparticle of the example with different magnification.

FIG. 3*a* to FIG. 3*e* are drawing illustrating the scanning electron microscope (SEM) images of the example and Comparative Examples 1 to 4.

FIG. 4*a* and FIG. 4*b* are drawings of overlapping a scanning electron microscope photograph in which the Raman-active nanoparticles produced of the example and Comparative Example 1 are positioned on a silicon substrate and observed and Raman mapping (780 nm laser, 5 mW) of an area observed by a scanning electron microscope, respectively.

FIG. 5*a* and FIG. 5*b* are drawings illustrating a Raman spectrum of the Raman-active nanoparticles which are Raman-mapped in FIG. 4*a* and FIG. 4*b* respectively.

DETAILED DESCRIPTION OF EMBODIMENTS

Hereinafter, the Raman-active nanoparticle of the present invention and a method of producing the same will be described in detail with reference to the accompanying drawings. The drawings to be provided below are provided by way of example so that the idea of the present invention can be sufficiently transferred to a person skilled in the art to which the present invention pertains. Therefore, the present invention is not limited to the drawings provided below but may be embodied in many different forms, and the drawings suggested below may be exaggerated in order to clear the spirit of the present invention. Technical terms and scientific terms used herein have the general meaning understood by those skilled in the art to which the present invention pertains unless otherwise defined, and a description for the known function and configuration which may unnecessarily obscure the gist of the present invention will be omitted in the following description and the accompanying drawings. In addition, the singular form used in the specification and claims appended thereto may be intended to also include a plural form, unless otherwise indicated in the context. Units used in the present specification and attached claims thereto without particular mention are based on weights, and as an example, a unit of % or ratio refers to a wt % or a weight ratio.

The Raman-active nanoparticle according to an exemplary embodiment of the present invention includes: a spherical plasmonic metal core; a plasmonic metal shell having surface irregularities; and a self-assembled monolayer which binds to each of the core and the shell, is positioned between the core and the shell, and includes a Raman reporter satisfying the following Chemical Formula 1:

$NO_2$—Ar—SH (Chemical Formula 1)

wherein Ar is a (C6-C12) arylene group.

Specifically, surface plasmon enhancement in a metal nanostructure may be highly limited to a specific position, which is called localized surface plasmon resonance (LSPR), and the area is called a hot spot area. In particular, when a Raman-active molecule is positioned at a hot spot of a plasmonic nanostructure, a surface-enhanced Raman scattering (hereinafter, referred to as SERS) effect occurs, and the hot spot is highly limited to a spatially narrow area like a nanogap, and the area is called a SERS hot spot.

The Raman-active nanoparticle of the present invention has a core-shell structure, and includes a self-assembled monolayer which is positioned between the core and the shell and includes a Raman reporter represented by a chemical formula of $NO_2$—Ar—SH (Ar is a (C6-C12) arylene group) having a sulfhydryl group (—HS) and a nitro group (—$NO_2$) which are surface binding functional groups at both ends, thereby forming a nanogap corresponding to the thickness of the self-assembled monolayer having a strictly adjusted thickness due to the characteristic of self-assembly in the Raman-active nanoparticle of the present invention. In addition, since the shape of the plasmonic metal core is spherical, the self-assembled monolayer has a spherical shape, and in the plasmonic metal shell also, the inner shape of the metal shell in contact with the self-assembled monolayer may have a spherical shape. Thus, the nanogap is positioned in the entire area of the Raman-active nanoparticle, and also, the nanogap having a uniform size may be positioned in all directions relative to the radical direction.

In particular, since the self-assembled monolayer positioned between the core and the shell includes the Raman reporter satisfying Chemical Formula 1, the Raman reporter is positioned at positions which are well-defined and radically identical in the Raman-active nanoparticle, and the Raman reporter which is uniformly positioned at a high density in the entire area of the Raman-active nanoparticle is positioned at the nanogap, that is, the hot spot where surface plasmon resonance occurs locally. That is to say, the Raman-active nanoparticle of the present invention has the Raman reporter satisfying Chemical Formula 1 positioned in the hot spot, thereby causing a SERS effect, so as to have a SERS hot spot area which is uniformly present in the entire area of the Raman-active nanoparticle.

Furthermore, regarding the method of producing a Raman-active nanoparticle described later, the Raman reporter satisfying Chemical Formula 1 allows formation of irregularities having a uniform size in the entire area of the surface of the metal shell, thereby having isotropic Raman activity in the nanoparticle, the Raman-active nanoparticle may show uniform SERS activity based on the particle, there is little deviation of Raman activity between particles so that uniform SERS activity between particles may be shown, and furthermore, since the surface of the metal shell has an irregular structure, a strong electromagnetic field is formed to significantly improve Raman intensity, and thus, Raman signal intensity may be excellent and a high correlation may be shown, as compared with the conventional particles.

Here, the correlation may refer to a relation with the number of Raman-active nanoparticles in which a SERS signal is detected, among all Raman-active nanoparticles in 2D mapping. That is, when a SERS signal is detected in many Raman-active nanoparticles, based on the total number of Raman-active nanoparticles, it is said that the correlation is high.

In addition, since the Raman-active nanoparticles according to an exemplary embodiment of the present invention have well-defined hot spots continuously in the entire area of the nanoparticle and a Raman reporter satisfying Chemical Formula 1 is uniformly positioned at a high density in the well-defined hot spots, a biochemical material (biomaterial) having a several to dozens of micrometer size may be also reproducibly detected.

As a specific example, the plasmonic metal shell may include plasmonic metal fine particles having an average size of 0.1D to 2D, based on a diameter (D) of the metal core, and may have surface irregularities due to the plasmonic metal fine particles.

Specifically, the metal shell in a state of binding to the self-assembled monolayer may be formed of metal fine particles having an average size of 0.1D to 2D, specifically 0.3D to 1D, more specifically 0.5D to 1D, and still more specifically 0.5D to 0.8D, based on the diameter (D) of the metal core, and the metal shell may have irregularities having a uniform size due to the particle shape of the metal fine particle. Since the metal fine particles forming the metal shell have the average size in the range described above based on the diameter of the metal core, the Raman signal intensity may be improved as compared with the conventional intensity.

Specifically, since the irregular structure due to the metal fine particles of the plasmonic metal shell may have a uniform size by the Raman reporter satisfying Chemical Formula 1 and the metal shell formed of the metal fine particles having the average size in the range described above, hot spots on the surface of the shell itself together with hot spots by the nanogap between the metal core and the metal shell may be formed, that is, hot spots may be formed according to a spaced distance between closest irregularities having a uniform size, which is more advantageous for Raman signal enhancement.

As an exemplary embodiment, the Raman-active nanoparticle having a core-shell structure may have a size of 25 to 250 nm, specifically 35 to 200 nm, more specifically 50 to 180 nm, and still more specifically 80 to 150 nm.

As a specific example, in the core shell structure, the shell may have a thickness of 15 to 60 nm, preferably 20 to 50 nm, and more preferably 25 to 40 nm.

Here, the thickness of the shell may refer to a distance from the surface of the core to the outermost part of the shell.

In the core-shell structure, since the metal shell which is formed of metal fine particles having the average size described above based on the diameter of the metal core has the thickness described above and has the surface irregular structure, a strong electromagnetic field is formed to significantly improve a Raman intensity.

In addition, since the metal fine particles themselves in the metal shell protrude to form bumpy irregularities in the entire area of the metal shell, the sensitivity of the Raman-active nanoparticle may be increased by the metal shell, uniform Raman activity may be shown in one particle, and also, uniformity of Raman activity between particles may not be inhibited.

The plasmonic metal core may have an average diameter of 20 to 100 nm, specifically 20 to 80 nm, more specifically 30 to 70 nm, and still more specifically 40 to 60 nm.

When the plasmonic metal core has the average diameter of 20 nm or more, preferably 30 nm or more, a radius of curvature is appropriate for forming a dense self-assembled monolayer, and nanogaps having a uniform size may exist by the self-assembled monolayer by interaction between the metal core and the Raman reporter, and thus, it is preferred that the average diameter of the plasmonic metal core satisfies the above range. However, the plasmonic metal core having an average diameter of less than 20 nm has an excessively large curvature and a small radius of curvature, so that it is difficult for the Raman reporter to form a dense self-assembled monolayer on the surface of the core, and thus, it is difficult to effectively form irregularities in the entire area of the metal shell, and the uniformity of Raman activity is deteriorated, which is thus not preferred.

In a specific example, the self-assembled monolayer may be the self-assembled monolayer of the Raman reporter, and the Raman reporter may refer to an organic compound (organic molecule) including a Raman-active molecule or an organic compound (organic molecule) having a binding force to the metal of the metal core and including a Raman-active molecule.

Since the Raman reporter has a binding force to the metal of the metal core, the self-assembled monolayer of the Raman reporter may be formed on the metal core to which a pure metal surface is exposed.

The Raman-active molecule may include a surface-enhanced Raman-active molecule, a surface-enhanced resonance Raman-active molecule, a hyper Raman-active molecule, or a coherent Van stokes Raman-active molecule, and the Raman-active molecule may have a Raman signal, or both the Raman signal and a fluorescence signal, of course.

As a specific example, the Raman reporter may be a Raman-active molecule in a benzene ring form, and the Raman-active molecule in a benzene ring form may be one or more selected from 2-nitrobenzenethiol (2-NBT) and 4-nitrobenzenethiol (4-NBT), preferably 4-nitrobenzenethiol (4-NBT).

In a specific example, the Raman reporter may satisfy the following Chemical Formula 2:

(Chemical Formula 2)

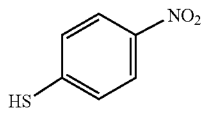

Specifically, conventionally, the nanogaps are present in the entire area of the Raman-active particle, but since the sizes of nanogaps are different depending on the position, the enhancement of the Raman signal intensity is limited, and reproducibility of detection of a target material is poor. However, in the Raman-active nanoparticle of the present invention, the self-assembled monolayer including the Raman reporter satisfying Chemical Formula 2 may have a spherical shape which is very similar to the radius of curvature of the spherical metal core, and thus, the size of the nanogap positioned in the entire area of the Raman-active nanoparticle is uniform, thereby having an improved Raman signal intensity.

In particular, when the average diameter of the plasmonic metal core is as described above, the self-assembled monolayer formed by the interaction with the Raman reporter satisfying Chemical Formula 2 forms a SERS hot spot area which is uniformly present in the entire area of the Raman-active nanoparticle, thereby significantly improving the Raman signal intensity.

In addition, since the nanogaps are formed between the metal core and the metal shell by the Raman reporter bound to the metal core, a length (size) of the Raman reporter may be 3 nm or less, specifically 0.5 to 2 nm, and more specifically 0.5 to 1 nm, in terms of forming hot spots where stronger signal enhancement is done. Here, the length (size) of the Raman reporter corresponds to the thickness of the self-assembled monolayer, of course.

As a specific example, each of the plasmonic metal core and the plasmonic metal shell may be a metal generating surface plasmon by an interaction with light. As an example, each of the plasmon metal core and the plasmon metal shell may be gold, silver, platinum, palladium, nickel, aluminum, copper, a mixture thereof, an alloy thereof, or the like. However, each of the plasmonic metal core and the plasmonic metal shell may be gold or silver, considering biocompatibility.

As another specific example, the plasmonic metal core and the plasmonic metal shell may be the same metal, and as an example, the plasmonic metal core and the plasmonic metal shell may be gold.

In a specific example, the Raman-active nanoparticles may further include a receptor which is fixed to the plasmonic metal shell and binds to an analyte. The receptor may be any material known to specifically bind to an analyte, such as complementary binding between enzyme-substrate, antigen-antibody, protein-protein, or DNA. Here, the receptor may include a functional group which spontaneously binds to the metal of the metal shell (as an example, a thiol group, a carboxyl group, an amine group, or the like), and may be in the state of being spontaneously and chemically bound to the metal shell by the functional group.

In a specific example, the Raman-active nanoparticles may further include a blocking molecule which covers a surface area of the shell to which the receptor is not attached (bound). The blocking molecule prevents an undesired interaction between the shell surface itself, not the receptor, and the analyte, and may serve to make orientation of the receptor positioned on the surface of the shell more constant. The blocking molecule may be any material which is commonly used for preventing nonspecific binding on the metal surface in the biosensor field, such as bovine serum albumin (BSA).

The analyte may be a material derived from the living (including a virus) or non-living thing. The living thing-derived material may include a cell component. Specifically, the analyte may include a lesion biomarker having lesion specificity, a pathogen, a protein, a nucleic acid, sugars, drugs, and the like. More specifically, the analyte may be an amino acid, a peptide, a polypeptide, a protein, a glycoprotein, a lipoprotein, a nucleoside, a nucleotide, an oligonucleotide, a nucleic acid, sugar, a carbohydrate, an oligosaccharide, a polysaccharide, a fatty acid, a lipid, a hormone, a metabolite, a cytokine, a chemokine, a receptor, a neurotransmitter, an antigen, an allergen, an antibody, a substrate, a metabolite, a cofactor, an inhibitor, a drug, a pharmaceutical material, a nutritional substance, a prion, a toxin, a poisonous material, an explosive material, an insecticide, a chemical weapon agent, a biohazard agent, a radioactive isotope, a vitamin, a heterocyclic aromatic compound, a carcinogen, a mutagen, an anesthetic, an amphetamine, a barbiturate, a hallucinogen, a waste, or a pollutant. In addition, when the analyte is a nucleic acid, the nucleic acid may include genes, viral RNA and DNA, bacterial DNA, fungal DNA, mammalian DNA, cDNA, mRNA, RNA, and DNA fragments, oligonucleotides, synthetic oligonucleotides, modified oligonucleotides, single- and double-stranded nucleic acids, natural and synthetic nucleic acid, and the like.

The analyte may be positioned in-vivo, and may be detected in-vivo. That is, the Raman-active nanoparticle described above may be for use in-vivo, and for biological injection.

On the contrary, the analyte may be positioned in-vitro, and may be detected in-vitro. That is, the Raman-active particle described above may be used in-vitro. Here, the analyte may be in the form of a sample collected in-vivo such as blood, urine, mucosal detachment, saliva, body fluids, tissues, biopsies, a combination thereof, or the like, but is not limited thereto.

In a specific example, the Raman-active nanoparticles may be for near-infrared excitation light having a wavelength of 750 nm or more, specifically a near-infrared ray having a wavelength of 750 to 1500 nm, and more specifically, for near-infrared excitation light having a wavelength of 750 to 1000 nm, a wavelength of 770 nm to 1500 nm, or a wavelength of 780 nm to 1000 nm. That is, the Raman-active nanoparticle allows detection and analysis of the analyte by light irradiation in a near-infrared region.

As is known, when visible light is irradiated on a biomaterial including a biochemical material, a fluorescence phenomenon may occur. Since fluorescence intensity is very strong as compared with Raman scattering and fluorescence occurs in a similar region to Raman scattering, it is difficult to obtain pure Raman spectrum covered with a fluorescence peak. Therefore, SERS analysis by light irradiation in a near-infrared region, not a visible region may obtain a Raman spectrum without an influence of fluorescence, and thus, is very advantageous in a biofield.

Substantially, when an analyte is detected using the Raman-active nanoparticles according to a specific example, basal fluorescence may not be substantially shown on a Raman spectrum of the analyte obtained by near-infrared irradiation.

However, the use of the Raman-active nanoparticle of the present invention should not be interpreted as being limited to use for a near-infrared ray, and the use of excitation light irradiated in a detection method of the present invention should not be interpreted as being limited to the use for a near-infrared ray. As an example, based on a center wavelength ($\lambda_{max}$) of a maximum absorption peak in a UV-visible light absorption spectrum of the Raman-active nanoparticles, light in a wavelength region of the center wavelength ($\lambda_{max}$)±150 nm, the center wavelength ($\lambda_{max}$)±100 nm, or the center wavelength ($\lambda_{max}$)±50 nm may be irradiated as excitation light, and in this case, a Raman spectrum in which larger Raman signal enhancement is formed may be obtained. In an exemplary embodiment, light in a wavelength region of 500 to 750 nm, 500 to 750 nm, 550 to 700 nm, or 600 to 680 nm may be irradiated as the excitation light.

In an exemplary embodiment, the SERS signal in the Raman mapping may be detected in 60% or more, specifically 70% or more, more specifically 80% or more, and unlimitedly 95% or less of the Raman-active nanoparticles among the total number of the Raman-active nanoparticles. Since the SERS signal in the Raman mapping is detected in the Raman-active nanoparticles in the above range, detection reliability and reproducibility of a target material may be significantly improved, which is thus preferred.

Here, when the Raman mapping may be the Raman mapping for an area having a predetermined size, and the predetermined size may be 1 to 100 μm×1 to 100 μm, but is not limited thereto. In addition, a mapping interval in the Raman mapping may be in a level of 0.1 μm to 10 μm to each of axes perpendicular to each other, an output of excitation light (excitation laser light) may be in a level of 1 mW to 90 mW, as a practical example, 1 mW to 10 mW, an excitation light irradiation time may be 0.5 to 10 seconds, and the number of scanning may be 1 to 5, but the present invention is not limited thereto.

The present invention includes a method of producing the Raman-active nanoparticles.

Hereinafter, the production method according to the present invention will be described in detail. Here, a metal core, a Raman reporter, a self-assembled monolayer, a metal shell, an analyte, a receptor, and the like are similar or identical to those described above for the Raman-active particle. Thus, the method of producing Raman-active particles according to the present invention includes all described above for the Raman-active nanoparticle.

The method of producing Raman-active nanoparticles according to the present invention is a method of producing Raman-active nanoparticles for surface-enhanced Raman scattering (SERS), and includes: a) forming a self-assembled monolayer including a Raman reporter satisfying the following Chemical Formula 1 on a spherical plasmonic metal core; and b) using a reaction solution in which a buffer solution, the metal core on which the self-assembled monolayer is formed, and a plasmonic metal precursor are mixed, to form a plasmonic metal shell which surrounds the metal core on which the self-assembled monolayer is formed and has surface irregularities:

$NO_2$—Ar—SH (Chemical Formula 1)

wherein Ar is a (C6-C12) arylene group.

Since the Raman-active nanoparticles of the present invention are produced so that a Raman reporter satisfying Chemical Formula 1 is used to form a self-assembled monolayer and then a plasmonic metal shell having surface irregularities is formed, the particles may have a uniform size of surface irregularities as compared with conventional Raman-active nanoparticles, the surface irregularities are evenly formed in all directions based on the center of the metal core, and thus, the size and shape of the Raman-active nanoparticles of the present invention are evenly formed to be advantageous for Raman signal enhancement. Thus, the Raman-active nanoparticles of the present invention may have an improved Raman signal intensity as compared with the conventional Raman-active particles.

In addition, since the Raman-active nanoparticles of the present invention use the Raman reporter satisfying Chemical Formula 1, the Raman-active nanoparticles having a core-shell structure having surface irregularities formed in a uniform size as compared with the conventional particles may be produced with excellent reproducibility.

Furthermore, generally in producing the Raman-active particles, an organic surfactant is used in a well-known manner, for providing proper reducibility for metal nanogranulation and designed shaping, suppressing growth of a metal to be nanogranulated, inducing the growth to a specific direction, and/or stabilizing the nanoparticles, and also, an organic acid or an organic acid which may substitute a surfactant is used.

However, since to the metal nanoparticles synthesized in the method as such, an organic surfactant (or an organic substance derived from an organic acid and an organic surfactant) which is harmful to a living body and may affect a biochemical is bound, a post-treatment process, such as capping the particles with a capping material having biocompatibility or substituting a harmful surface functional group of the organic surfactant and the like with another functional group having biocompatibility, is essentially required, in order to be used in a biofield. Since the capped metal nanoparticles have a reduced SERS effect by the capping material, when the particles are used in biosensing or bioimaging, there may be a limitation in high sensitivity and detection reliability may be lowered, and when the organic surfactant is to be substituted with a biocompatible functional group, it is difficult to completely substitute the organic surfactant which substantially binds to a metal material with very strong binding force with a biocompatible functional group, and thus, the metal nanoparticles still remain toxic.

However, since in the method of producing Raman-active nanoparticles according to another exemplary embodiment of the present invention, a self-assembled monolayer having a Raman reporter is formed on a metal core having a bare metal surface, and then a buffer solution which already has biocompatibility and a solution containing a metal precursor are used to form a metal shell, the thus-produced Raman-active nanoparticles are free from the organic surfactant which is harmful to a living body, and thus, has biocompatibility without a separate post-treatment process. Accordingly, in the method of producing Raman-active nanoparticles according to an exemplary embodiment of the present invention, the reaction solution may not include a surfactant (organic surfactant), and furthermore, the reaction solution may not include both the surfactant and the organic acid.

In addition, in the method of producing Raman-active particles according to the present invention, since the Raman-active nanoparticles are produced by a simple process of attaching the Raman reporter on the metal core and using a solution including the buffer solution and the metal precursor to form a metal shell, the Raman-active particles may be mass-produced within a short time at low cost, and thus, commerciality may be excellent, and since the organic substance including the Raman reporter is not exposed to the surface of the Raman-active nanoparticle but is surrounded by the metal shell, the organic substance including the Raman reporter may be stably protected from an external environment.

Therefore, the method of producing Raman-active nanoparticles according to the present invention is free from the problem of a reduced SERS effect by capping to have excellent reproducibility and reliability, has sensitivity to allow single molecule detection, and may mass-produce the Raman-active nanoparticles having biocompatibility at low cost by a simple process without a separate post-treatment.

FIG. 1 is a schematic diagram which schematically shows a process of producing the Raman-active nanoparticles of the present invention.

In the Raman-active nanoparticle of the present invention, the Raman reporter binds to the surface of a spherical core metal, whereby a self-assembled monolayer is formed, and then a metal shell having surface irregularities surrounding the metal core having the self-assembled monolayer formed thereon is formed, and thus, a core-shell structure is produced.

In a specific example, step a) of forming a self-assembled monolayer including a Raman reporter satisfying the Chemical Formula of $NO_2$—Ar—SH (Ar is a (C6-C12) arylene group) on the metal core may include a step of preparing a mixed solution including the metal core and the Raman reporter and ultrasonically stirring the solution.

Specifically, step a) may include a1) mixing the metal core and the Raman reporter so that the molar concentrations thereof are 0.01 to 1 nM and 10 to 1000 μM, to prepare a mixed solution; a2) ultrasonically stirring the solution to perform a reaction at room temperature for 10 to 30 minutes; and a3) separating and recovering the metal core to which the Raman reporter is fixed. Here, the mixed solution may be an aqueous mixed solution, but is not necessarily limited thereto.

In the step of forming the self-assembled monolayer including the Raman reporter on the metal core, forming the Raman reporter into double layers is suppressed by performing ultrasonic stirring for the time in the above range, thereby forming nanogaps corresponding to the thickness of the self-assembled monolayer described above.

In a specific example, the nanogap corresponding to the thickness of the self-assembled monolayer may be formed by the Raman reporter satisfying the following Chemical Formula 2:

(Chemical Formula 2)

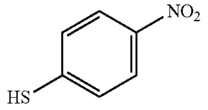

Specifically, the self-assembled monolayer formed by the Raman reporter satisfying Chemical Formula 2 may have a spherical shape which is very similar to the radius of curvature of the spherical metal core, and the size of the nanogap corresponding to the thickness of the self-assembled monolayer is uniformly formed, thereby having an improved Raman signal intensity. In particular, due to the effect, when the plasmonic metal core has an average diameter of 20 to 100 nm, specifically 20 to 80 nm, more specifically 30 to 70 nm, and still more specifically 40 to 60 nm, the self-assembled monolayer formed by an interaction with the Raman reporter satisfying Chemical Formula 2 forms a SERS hot spot area which is uniformly present in the entire area of the Raman-active nanoparticle, thereby significantly improving a Raman signal intensity.

After performing step a), step b) of forming a metal shell surrounding the metal core to which the Raman reporter is fixed from a reaction solution in which a buffer solution, the metal core on which the self-assembled monolayer is formed by fixing the Raman reporter to the metal core, and the metal precursor are mixed may be performed.

In step b) of forming the metal shell, a hydrogen ion concentration index (pH) of the buffer solution included in the reaction solution may be 5.5 to 7.5, preferably 6 to 7.

A mole ratio between a buffer in the buffer solution and the metal precursor (mole ratio obtained by dividing the number of moles of the buffer by the number of moles of the metal precursor) may be 10 to 100, preferably 20 to 80.

The thickness and the shape of the metal shell formed to surround the metal core may be changed depending on the pH environment of a buffer solution and the concentration of a reaction material, and as described above, in order to form a thin metal shell which completely surrounds the Raman reporter fixed to the metal core and form a metal shell having surface irregularities having a uniform size by the metal fine particles, it is preferred that the pH of the buffer solution and the mole ratio between the buffer and the metal precursor may be in the range described above.

As a specific example, the buffer solution may include one or more selected from 4-(2-hydroxyethyl)-1-piperazineethanesulfonic acid (HEPES), 4-(2-hydroxyethyl)piperazine-1-ethanesulfonic acid (MES), phosphated buffered saline (PBS), tris(2-amino-2hydroxymethyl propane-1,3-idol), phosphate buffer (PB), 3-(N-morpholino)propanesulfonic acid (MOPS), 3-[[1,3-dihydroxy-2-(hydroxymethyl)propan-2-yl]amino]propane-1-sulfonic acid (TAPS), and piperazine-N,N'-bis(2-ethanesulfonic acid) (PIPES). The buffer of the buffer solution may serve as a weak reducing agent which reduces a metal, and allows a surfactant for stabilizing the Raman-active particles produced by the buffer of the buffer solution to be excluded.

The metal of the metal precursor may be gold, silver, platinum, palladium, nickel, aluminum, copper, a mixture thereof, an alloy thereof, or the like. However, the metal of the metal precursor may be preferably gold or silver, independently of the metal of the metal core, in consideration of biosafety. As an example, the metal of the metal precursor may be the same metal as the metal of the metal core.

The metal precursor according to an advantageous example may be a gold precursor such as $HAuCl_4$, $HAuBr_4$, $NaAuCl_4$, $AuCl_3 \cdot 3H_2O$, $NaAuCl_4 \cdot 2H_2O$, or a mixture thereof, or a silver precursor such as $AgNO_3$, but is not limited thereto.

In a specific example, in step b), the buffer solution, the metal precursor solution, and the metal core dispersion to which the Raman reporter is fixed are mixed to prepare a reaction solution, and the reaction is performed at a temperature of 15 to 40° C., specifically at a temperature of 15 to 35° C., more specifically at a temperature of 15 to 25° C., and still more specifically at room temperature of 21 to 25° C. The metal shell may be prepared by reacting the reaction solution for 10 minutes to 50 minutes, specifically 20 minutes to 40 minutes, but the present invention is not limited to the reaction time of the reaction solution.

Here, stirring may be performed at the time of the reaction and the stirring may be performed at a speed of 500 to 1200 rpm, specifically 600 to 1000 rpm, and more specifically 600 to 800 rpm, and the reaction is completed by adding an excess amount of deionized water to the reaction solution to suppress the synthesis reaction.

A molar concentration of the buffer in the buffer solution may be 10 to 200 mM, specifically 10 to 100 mM, and a molar concentration of the metal precursor in the metal precursor solution may be 1 to 20 mM, specifically 1 to 10 mM. A molar concentration of the metal core in the metal core dispersion to which the Raman reporter is fixed may be 0.01 to 1.0 nM, specifically 0.01 to 0.5 nM, but is not necessarily limited thereto.

The buffer solution and the metal precursor solution may be mixed so that the mole ratio between the buffer and the metal precursor described above is satisfied, and the metal core dispersion may be mixed so that the mole ratio of the metal precursor to metal core is $1:1\times10^{-7}$ to $1\times10^{-5}$. Here, the metal precursor solution and the metal core dispersion are first mixed, and then the buffer solution is mixed, so that the metal shell may be uniformly formed on the metal core(s).

Specifically, step b) may include b1) mixing the metal precursor solution and the metal core dispersion to prepare a precursor-metal core mixed solution; b2) mixing the buffer solution with the precursor-metal core mixed solution to prepare a reaction solution and reacting the reaction solution at a temperature of 15 to 40° C., advantageously at room temperature to prepare Raman-active nanoparticles; and b3) separating and recovering the produced Raman-active particles, adding the recovered Raman-active nanoparticles to a buffer solution (a separate buffer solution), and storing the solution at a temperature of 1 to 10° C., specifically at a temperature of 1 to 5° C.

By step b), the Raman-active nanoparticles including the metal core, the self-assembled monolayer of the Raman reporter surrounding the metal core, and the metal shell surrounding the self-assembled monolayer may be produced, and the Raman-active nanoparticles may have an average size of 200 nm or less, specifically an average size of 180 nm or less, substantially a size of 50 to 180 nm, and more substantially a size of 80 to 150 nm.

In a specific example, the method of producing Raman-active nanoparticles may further include, after step b), c) fixing a receptor which binds (specifically binds) to an analyte to the metal shell, after step b). Step c) may be performed by mixing the receptor with the prepared Raman-active nanoparticle dispersion solution, and fixing may be performed depending on a protocol known for each receptor, of course.

In addition, before step a), a step of washing the metal core using an organic solvent and the like, so that the spherical metal core has a bare metal surface, may be further performed, but the washing is only performed when needed.

EXAMPLES 4 mL of a solution of spherical Au colloid (EM.GC50, BBI solution) having a diameter of 50 nm was centrifuged at 4000 rpm for 10 minutes to remove a supernatant, and then was mixed with 4 mL of a 0.1 mM bis(p-sulfonatophenyl)phenylphosphine dihydrate dipotassium salt (BSPP) solution to prepare an Au core dispersion having a molar concentration of 0.1 nM.

4 mL of the Au core dispersion and 16 μL of a 10 mM 4-nitrobenzenethiol (4-NBT) solution were mixed (the final concentration of 4-NBT was 40 μM), was sonicated for 10 minutes, and was centrifuged at 4000 rpm for 10 minutes to recover an Au core dispersion in which a self-assembled monolayer of 4-NBT which was a Raman reporter was formed.

To 1 mL of the Au core dispersion recovered in which the self-assembled monolayer of 4-NBT was formed, 5 mL of a 50 mM HEPES buffer solution at pH 6.5 and 1 mL of 5 mM $HAuCl_4$ (254169, Sigma-Aldrich) were added to prepare a reaction solution, which was stirred at 700 rpm for 30 minutes. At this time, the pH of the buffer solution was adjusted using 1 mM NaOH and 1 mM HCl.

Thereafter, the reaction solution was successively centrifuged at 4000 rpm for 10 minutes to remove the supernatant, 4 mL of 0.1 mM BSPP was mixed with the reaction solution from which the supernatant was primarily removed, and then centrifugation at 3000 rpm for 10 minutes was performed to secondarily remove the supernatant. Thereafter, 4 mL of 0.1 mM BSPP was further mixed with the reaction solution from which the supernatant was secondarily removed, centrifugation was performed five times at 2000 rpm for 10 minutes to remove the supernatant, and then 4 mL of deionized water was added to end the reaction.

The finally obtained Raman-active nanoparticles were added to 1 mL of a 50 mM HEPES buffer solution and stored at a temperature of 4° C.

Comparative Example 1

A self-assembled monolayer was formed on an Au core in the same manner as in Example 1, except that 1,4-benzenedithiol (1,4-BDT) was used as the Raman reporter.

Comparative Example 2

A self-assembled monolayer was formed on an Au core in the same manner as in Example 1, except that 4-Aminobenzenethiol (4-ABT) was used as the Raman reporter.

Comparative Example 3

A self-assembled monolayer was formed on an Au core in the same manner as in Example 1, except that 2-naphthalenethiol (2-NAT) was used as the Raman reporter.

Comparative Example 4

A self-assembled monolayer was formed on an Au core in the same manner as in Example 1, except that 3-Methoxybenzenethiol (3-MeOBT) was used as the Raman reporter.

Comparative Example 5

A self-assembled monolayer was formed on an Au core in the same manner as in Example 1, except that 2,3,5,6-Tetrafluoro-4-mercaptobenzoic acid (TFMBA) was used as the Raman reporter.

Comparative Example 6

A self-assembled monolayer was formed on an Au core in the same manner as in Example 1, except that 2,7-mercapto-4-methylcoumarin (MMC) was used as the Raman reporter.

FIG. 2*a* and FIG. 2*b* are transmission electron microscope (TEM) images of the Raman-active nanoparticle of the example with different magnification.

It was confirmed that the self-assembled monolayer of the Raman reporter was positioned between an Au core and an Au shell of a polycrystal formed of Au fine particles, and uniform nanogaps having a thickness of 0.8 nm were formed in the entire area of the particle. The average size of the Raman-active nanoparticles of the example was 120 nm, and the average size of the Au fine particles forming the shell was 34 nm.

FIG. 3*a* to FIG. 3*e* are drawing illustrating the scanning electron microscope (SEM) images of the example and Comparative Examples 1 to 4. FIG. 3*a* is an SEM image corresponding to the example, and FIG. 3*b*, FIG. 3*c*, FIG. 3*d*, and FIG. 3*e* are SEM images of Comparative Example 1, Comparative Example 2, Comparative Example 3, and Comparative Example 4, respectively.

As shown in FIG. 3*a*, it is confirmed that Raman-active nanoparticles having a shell formed thereon having surface irregularities having a uniform size by the Au fine particles were prepared, and the size of the Raman-active nanoparticles prepared was also uniform.

In the example, it is recognized that the Au fine particles protruded to uniformly form surface irregularities on the shell, and it is confirmed that the surface irregularities were evenly formed by the protrusion of fine particles in all directions based on the core particle center, but in Comparative Examples 1 to 4, it is recognized that the surface irregularities were unevenly formed, and it is confirmed that the shape of the Raman-active nanoparticles was not even.

The particles of the example had isotropic Raman activity in the nanoparticle by bumpy irregularities which were evenly formed in the entire area of the surface of the metal shell, thereby showing uniform SERS activity based on the particle, and since each Raman-active nanoparticle had a uniform size, there was little deviation of Raman activity between the particles, thereby showing uniform SERS activity between the particles. This shows that, as seen in the results of Raman mapping described later, the example may perform a larger Raman signal enhancement as compared with Comparative Examples 1 to 6, thereby having an improved Raman signal intensity and showing a higher correlation.

In addition, when the Raman-active nanoparticles were repeatedly produced under the conditions, the reproducibility of the Raman-active nanoparticles having a core-shell structure having surface irregularities in the example was better than those of Comparative Examples 1 to 6.

FIG. 4*a* and FIG. 4*b* are drawings of overlapping a scanning electron microscope photograph in which the Raman-active nanoparticles produced of the example and Comparative Example 1 are positioned on a silicon substrate and observed and Raman mapping (780 nm laser, 5 mW) of an area observed by a scanning electron microscope, respectively.

As seen in FIG. 4*b*, in Comparative Example 1, the Raman-active nanoparticles for which the SERS signal was detected was 24% of the total Raman-active nanoparticles which is low, but in the example, it was confirmed that the SERS signal was detected in 83% of the total Raman-active nanoparticles, which shows that the Raman-active nanoparticles of the example had a remarkably better correlation than the Raman-active nanoparticles of Comparative Example 1.

In addition, it was confirmed that in Comparative Examples 2 to 6, the SERS signal was detected at a similar level to Comparative Example 1.

FIG. 5*a* and FIG. 5*b* are drawings illustrating a Raman spectrum of the Raman-active nanoparticles which are Raman-mapped in FIG. 4*a* and FIG. 4*b* respectively. FIG. 5*a* is a Raman spectrum corresponding to the example, and FIG. 5*b* is a Raman spectrum of Comparative Example 1. As seen in FIG. 5*a* and FIG. 5*b*, the example had a Raman signal intensity which was improved by 55% as compared with Comparative Example 1. In Comparative Examples 2 to 6 also, it was confirmed that the Raman signal intensity was similar to that of Comparative Example 1, and it is recognized therefrom that the example had an improved Raman signal intensity as compared with those of Comparative Examples 1 to 6, thereby being advantageous for detection of a target substance.

This is recognized as being possible due to the fact that the Raman-active nanoparticles of the example had nanogaps and surface irregularities having a uniform size formed evenly in all directions based on the metal core particle center, and the size and the shape of each Raman-active nanoparticle were also evenly formed, as compared with the Raman-active nanoparticles of Comparative Examples 1 to 6.

Hereinabove, although the present invention has been described by specific matters, limited exemplary embodiments, and drawings, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

What is claimed is:

1. A Raman-active nanoparticle comprising:

a spherical plasmonic metal core;

a plasmonic metal shell having surface irregularities having a uniform size in an entire area of a surface of the plasmonic metal shell; and a self-assembled monolayer which binds to each of the core and the shell, is positioned between the core and the shell, and includes a Raman reporter satisfying the following Chemical Formula 1:

$NO_2$—Ar—SH [Chemical Formula 1]

wherein Ar is a (C6-C12) arylene group, and wherein the plasmonic metal shell includes plasmonic metal fine particles having an average size of 0.1D to 0.8D, based on a diameter (D) of the metal core, and has surface irregularities having a uniform size in the entire area of the surface of the plasmonic metal shell due to the plasmonic metal fine particles.

2. The Raman-active nanoparticle of claim 1, wherein the Raman reporter satisfies the following Chemical Formula 2:

[Chemical Formula 2]

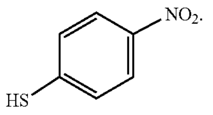

3. The Raman-active nanoparticle of claim 2, wherein a surface-enhanced Raman scattering signal in Raman mapping is detected in 60% or more of the Raman-active nanoparticles among all Raman-active nanoparticles.

4. The Raman-active nanoparticle of claim 2, wherein the plasmonic metal shell includes plasmonic metal fine particles having an average size of 0.3D to 0.8D, based on a diameter (D) of the metal core, and has surface irregularities having a uniform size in the entire area of the surface of the plasmonic metal shell due to the plasmonic metal fine particles.

5. The Raman-active nanoparticle of claim 4, wherein in the plasmonic metal shell, an inner shape of the shell in contact with the self-assembled monolayer is spherical.

6. The Raman-active nanoparticle of claim 4, wherein the plasmonic metal core has an average diameter of 20 to 100 nm.

7. The Raman-active nanoparticle of claim 4, wherein the self-assembled monolayer has a thickness of 0.5 to 2.0 nm.

8. The Raman-active nanoparticle of claim 1, wherein the plasmonic metal core and the plasmonic metal shell are independently of each other one or more metals selected from gold, silver, platinum, palladium, nickel, aluminum, and copper.

9. The Raman-active nanoparticle of claim 8, wherein the plasmonic metal core and the plasmonic metal shell are the same metal.

10. The Raman-active nanoparticle of claim 1, further comprising:

a receptor which is fixed to the plasmonic metal shell and binds to the analyte.

11. A method of producing the Raman-active nanoparticle of claim 1, the method comprising:

a) forming the self-assembled monolayer including the Raman reporter satisfying the following Chemical Formula 1 on the spherical plasmonic metal core; and b) using a reaction solution in which a buffer solution, the metal core on which the self-assembled monolayer is formed, and the plasmonic metal precursor are mixed, to form a plasmonic metal shell which surrounds the metal core on which the self-assembled monolayer is formed and has surface irregularities having a uniform size in the entire area of the surface of the plasmonic metal shell:

$NO_2$—Ar—SH [Chemical Formula 1]

wherein Ar is a (C6-C12) arylene group.

12. The method of claim 11, wherein the Raman reporter satisfies the following Chemical Formula 2:

[Chemical Formula 2]

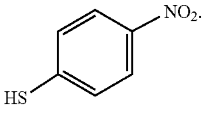

13. The method of claim 11, wherein a mole ratio obtained by dividing the number of moles of a buffer in the buffer solution by the number of moles of the plasmonic metal precursor is 10 to 100.

14. The method of claim 11, wherein a molar concentration of the buffer in the buffer solution is 10 to 200 mM.

15. The method of claim 11, wherein the plasmonic metal core has a diameter of 20 to 100 nm.

16. The method of claim 11, further comprising:

after b), c) fixing a receptor which binds to the analyte to the plasmonic metal shell.

* * * * *